July 20, 1965   O. C. G. LÄRKFELDT ETAL   3,195,738
LARGE-SIZE CONCRETE PIPE WITH A SUBSTANTIALLY
ELLIPTICAL RING-SHAPED OR HELICAL
REINFORCING MEANS
Filed May 3, 1963                                   2 Sheets-Sheet 2
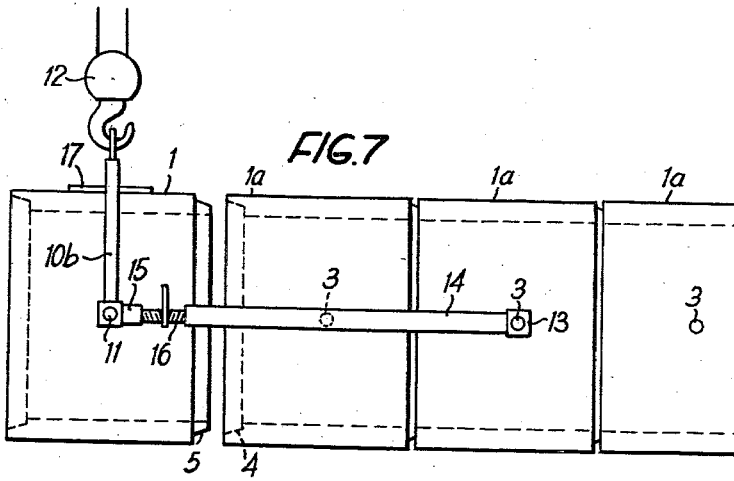
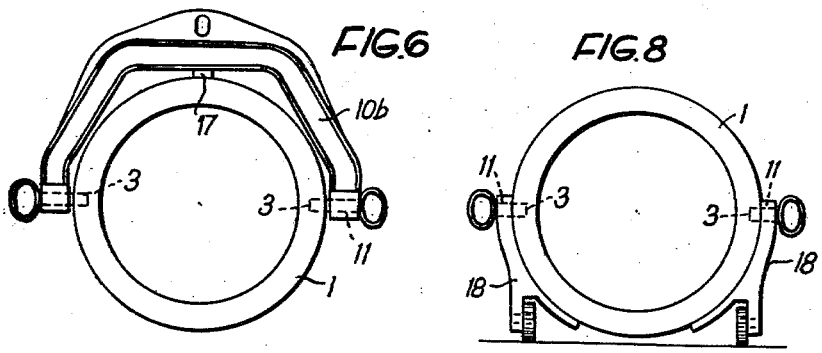
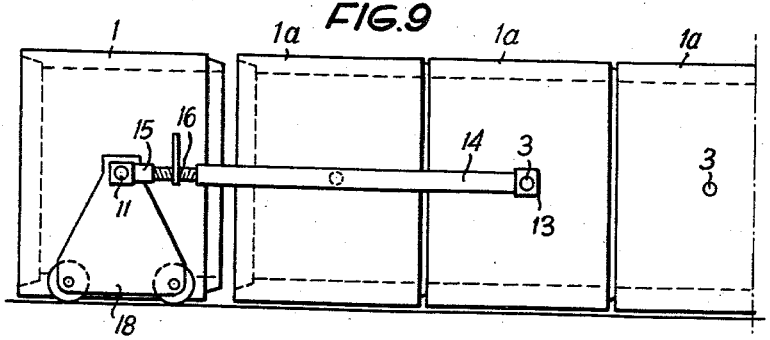

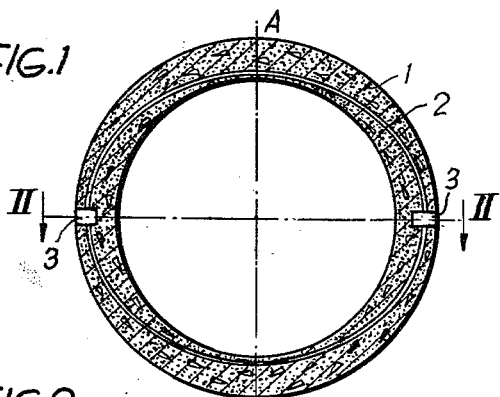
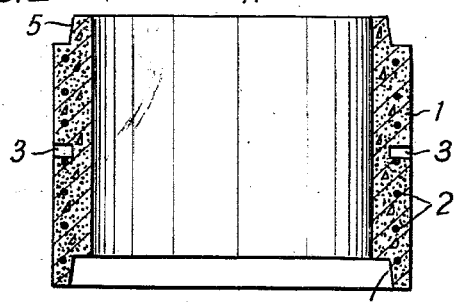
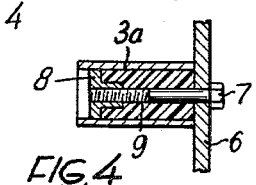
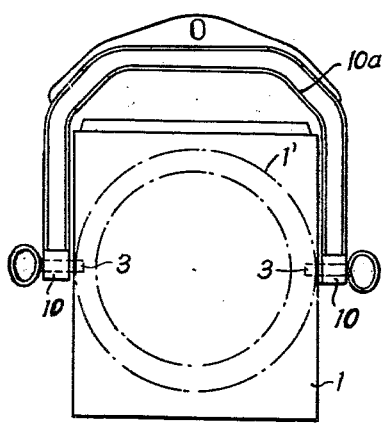
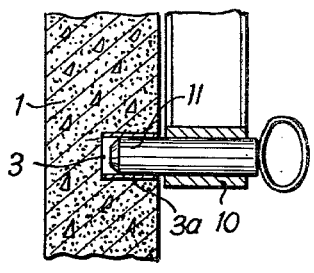

United States Patent Office 3,195,738
Patented July 20, 1965

3,195,738
LARGE-SIZE CONCRETE PIPE WITH A SUBSTANTIALLY ELLIPTICAL RING-SHAPED OR HELICAL REINFORCING MEANS
Ove Carl Gunnar Lärkfeldt, Stockholm, and Frank Ellert Fransson, Goteborg, Sweden, assignors to AB Skånska Cementgjuteriet, Stockholm, Sweden, a corporation of Sweden
Filed May 3, 1963, Ser. No. 277,850
Claims priority, application Sweden, May 3, 1962, 4,964/62
1 Claim. (Cl. 214—1)

This invention relates to reinforced large-size concrete pipes which means pipes of such size and weight which in rationalized operation are transported and deposited by means of transport devices which may even include cranes. The pipes in consideration are usually of a diameter of more than 20 inches and up to about 7 feet and may in the latter case weigh several tons.

The reinforcing means in pipes of this kind having a round and usually circular outline in cross section consists as a rule of a plurality of closed rings or sometimes of helical reinforcing iron. In smaller pipes a series of rings may be provided in the central part of the wall of the pipe whereas in case of large-size pipes it is common practice to provide two series of reinforcing rings one near the outer surface and the other one near the inner surface of the wall of the pipe in order to take the tensile stresses exerted on the concrete in lying pipes. However, since the tensile stresses at the top and base of a lying pipe are acting near the inner surface of the wall of the pipe whereas the tensile stresses at the side parts of the pipe are acting near the outer surface, such double reinforcement involves a waste of expensive material. To avoid this inconvenience it has been suggested to use a single reinforcement consisting of elliptical rings which at the top and base are extending near the inner surface of the wall of the pipe and at the side parts are extending near the outer surface of the pipe. However, this suggestion has been objected to for the reason that there is no guarantee that the intended top of the pipe will be placed upmost in the pipe-laying operation. An application of marks indicating where the intended top is located cannot be considered a reliable guarantee that the top and base of the pipe will be placed in correct positions because it would be permanently necessary to check whether or not the workers are paying attention to the marks. The pipes are usually transported, lifted and lowered by means of a rope or cable which is passed through the pipe, but it is almost impossible during manipulation of the pipe to see to it that this rope or cable will remain in correct position relative to the mark and that the marked portion will not be dislocated when the heavy pipe is to be prized into contact with a previously deposited pipe. Faulty deposition of an ovally reinforced pipe involves serious risks of damage to the piping. For this reason elliptical reinforcing rings have hitherto not been used in practice for ordinary line pipes.

The invention which relates to concrete pipes with substantially elliptical ring-shaped or helical reinforcing means provides an improved construction which eliminates the above named risks of wrong location of the pipes in the pipe-laying operation and also results in other advantages. In accordance with the invention the pipe has means for hitching it to a transport device, said hitch means being provided at the circumference of the pipe and disposed on either side of a central longitudinal plane containing the minor axis of the reinforcing ellipse.

In a preferred construction the two hitch means are located at equal distances from said longitudinal plane and in substantially diametrically opposite relation. Advantageously, the hitch means are located substantially in a cross sectional plane containing the centre of gravity of the pipe.

Due to the fact that the pipe during transportation and lowering or displacement to its proper position in the piping is carried by the transport device by means of definite and fixedly positioned hitch members it is fully ensured that the top of the pipe in the final position will be correctly located so as to have the oval reinforcing means fulfilling the intended purpose.

In its simplest form each hitch means consists of a lined hole in the wall of the pipe. The hole is suitably formed in the casting operation of the pipe and a metallic lining can be simultaneously secured in the hole. By means of pins inserted in the holes the pipe can be hooked onto the transport device. If permitted by the casting conditions outwardly projecting pins may be secured to the wall of the pipe by casting.

The invention is described more closely hereinbelow with reference to embodiments thereof illustrated in the annexed drawing.

FIG. 1 is a cross sectional view of a pipe according to the invention. FIG. 2 is a sectional view along the line II—II in FIG. 1. FIG. 3 illustrates a protective bearing sleeve inserted into the wall of the pipe during the casting operation. FIG. 4 is a fragmentary section of the pipe hooked on to a transport device and FIG. 5 shows the pipe carried by the transport device. FIG. 6 shows the pipe hung to another type of transport device and FIG. 7 illustrates the same pipe ready to be joined to pipes already deposited in the ground. FIGS. 8 and 9 illustrate in a manner corresponding to FIGS. 6 and 7 a transport device according to a further modification.

Referring to FIGS. 1 and 2 numeral 1 denotes a concrete pipe circular in cross section and having reinforcing means consisting of steel rings 2 of substantially elliptical form. A central longitudinal plane A—A through the intended top of the pipe passes through the minor axis of the reinforcing ellipse. Consequently, the reinforcing means will be located at those places of the pipe which will be subjected to high tensile stresses when the pipe has been correctly placed in the ground. Provided of either side of the plane A—A is a hitch device which in the embodiment exemplified is in the form of a hole 3 in the wall of the pipe for engagement with a transport device to be described later on. At one end the pipe has a substantially axial inner annular guiding and sealing surface 4 and at the opposite end the pipe has a similar outer sealing surface 5 for engagement with the inner sealing surface 4 of an adjacent pipe.

The holes 3 are suitably reinforced by a tubular lining 3a, FIGS. 3 and 4. The linings may be secured in the pipe by casting in connection with the formation of the holes. As exemplified in FIG. 3 the sleeve 3a is secured during the casting operation to the outer mould 6 of the pipe by means of a screw 7 which is screwed into a disk 8 displaceable within the tubular sleeve 3a. On tightening the screw a rubber block 9 is forced against the inner wall of the sleeve 3a so as to retain the sleeve in contact with the outer mould.

A part 10, FIG. 4, which belongs to a transport device has a withdrawable pin 11 for each hole 3, 3a. In the embodiment exemplified in FIG. 5 the transport device comprises a high stirrup-shaped yoke 10a each of the opposite hitching pins of which is received in the appertaining hole 3. The holes are located in diametrically opposite relation in a transverse plane of the pipe 1 which plane substantially extends through the centre of gravity of the pipe. In FIG. 5 the pipe 1 is shown in full lines in the position which assumes in the casting equipment after the mould has been removed. The transport device may be carried by a telpher line such that the pipe can be transported to or from a storage space either in the position shown by full lines or in a position shown by broken lines 1' in which the pipe is swung about the pins 11.

In FIGS. 6 and 7 there is illustrated a stirrup-shaped device 10b which is adapted to be hooked to a crane hook 12 and used to put the pipe 1 in place relative to a piping deposited in the ground. By means of the pins engaging the holes 3 the pipe is all the time kept in a position such that the above named top always assumes a definite position relative to the vertical. The holes 3 or pins or similar members secured therein can now be used for guiding the pipe when it is joined to previously deposited pipes 1a. On either side of the row of pipes there is provided a contraction device which by means of a pin 13 is secured in the hole 3 of a previously deposited pipe 1a and also is adapted to be connected to the transport device 10b. For example, the contraction device may consist of a bar 14 connected to the pin 13 and having a threaded end hole and an internally threaded stud 15 articulated to the device 10b. By means of a turnbuckle 16 cooperating with the threaded holes the device 10b together with the pipe 1 can be moved toward the pipe 1a and is guided by the guiding and sealing surfaces 4, 5. A sealing ring, for instance a rubber ring, is inserted between the adjoining pipes. The pipe is maintained in horizontal position by a wedge 17 inserted between the upper part of the yoke 10b and the pipe.

Instead of the bar 14 a chain, wire, cable or the like may be used and the parts 15, 16 may be replaced by a hydraulic cylinder the piston of which is connected to said chain or the like.

FIGS. 8 and 9 illustrate an arrangement which is particularly suitable for joining pipes which are placed in an underground passage or a deep shaft where there is often a very small space available laterally of the piping. In such case the transport device consists of two carriages 18 having single-row wheels. The carriages support the pipe on either side thereof, the pipe being by means of the holes 3 suspended from the pins 11 extending through the carriages. The carriages are shaped so as to contact the sides of the pipe. The double carriage may run on rails disposed on either side of the pipe. In this case too a contraction device 13–16 may be used and the pipe can also be placed in a final position with unfailing correct location of the elliptical reinforcing means, that is, with the plane A—A FIG. 1 extending vertically.

While in the above description the reinforcing means has been characterized as substantially elliptical it may equally well be characterized as substantially oval. The essential thing is that the reinforcing iron due to the shape of the reinforcing means will be located at those places of the concrete pipe where the material of the lying pipe is subjected to tensile stresses. Because of the size and weight of the reinforcing means it is impossible to predetermine its exact geometrical shape in the casting mould or in the finally cast pipe.

While the drawing illustrates a circular pipe the invention is equally well applicable for instance to pipes having an oval outer surface in cross-section and/or oval openings.

What is claimed is:

In combination with a large-size concrete pipe having a circular cross section and a substantially elliptical ring-shaped or helical reinforcing means, hitch means for hitching the pipe to a transport device, said hitch means comprising radially extending holes in the outer wall of the pipe, said holes being located on either side of the pipe substantially in a horizontal central plane containing the major axis of the reinforcing ellipse and further located substantially in a cross sectional plane containing the centre of gravity of the pipe, said transport device comprising a stirrup-shaped lifting yoke the ends of which are provided with pins fitting into the said holes in the wall of the pipe, each end of the yoke having connecting means for one end of a contracting device the other end of which is connectable by means of a pin to the corresponding hole of a second pipe of the same sort so that the first pipe can be forced by means of said contracting device toward the said second pipe while maintaining the main axis of the reinforcing ellipses of the first and second pipes in a horizontal plane.

References Cited by the Examiner

UNITED STATES PATENTS

| | | | |
|---|---|---|---|
| 1,195,147 | 8/16 | Mitchell. | |
| 1,644,196 | 10/27 | Longfellow | 138—175 X |
| 1,872,514 | 8/32 | Shafer | 50—81 X |
| 2,007,969 | 7/35 | Grodsky | 61—72.1 |
| 2,390,293 | 12/45 | Colson. | |
| 2,412,488 | 12/46 | Austin. | |
| 2,443,307 | 6/48 | De Cuir. | |
| 2,717,615 | 9/55 | Peckworth | 138—175 |
| 2,881,928 | 4/59 | Morris. | |
| 2,895,299 | 7/59 | Washabaugh | 61—45 |
| 3,012,406 | 12/61 | Lassen-Nielsen | 61—72.1 X |

HUGO O. SCHULZ, *Primary Examiner.*